July 20, 1937.  C. H. EHLERS  2,087,247
HOSE HOUSING FOR TANK CARRYING VEHICLES
Filed April 12, 1934
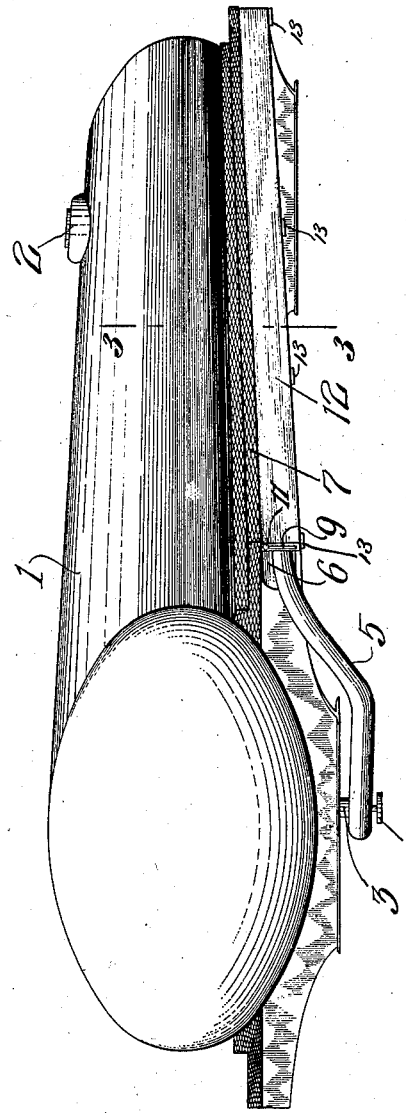
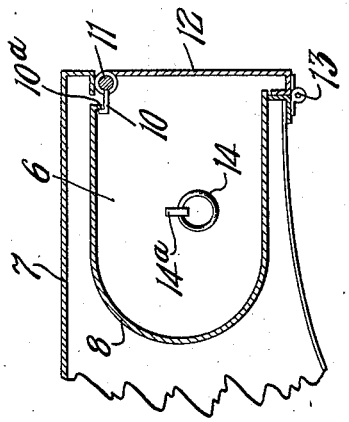
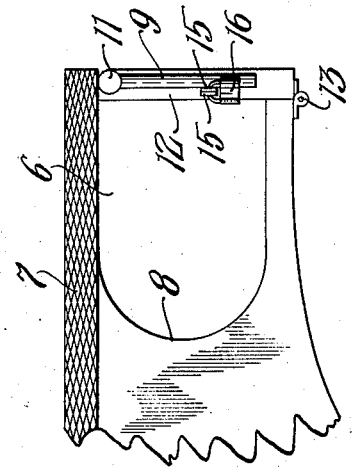
Inventor
Carl H. Ehlers
By T. Wallace Quinn
his Attorney

UNITED STATES PATENT OFFICE 2,087,247

HOSE HOUSING FOR TANK-CARRYING VEHICLES

Carl H. Ehlers, Penfield, Pa., assignor to The Atlantic Refining Company, Philadelphia, Pa., a corporation of Pennsylvania Application April 12, 1934, Serial No. 720,300

1 Claim. (Cl. 280—5)

The present invention relates to improvements in housings in which may be carried a hose such as one that forms a part of the equipment of a tank truck or the like. A housing within the contemplation of my invention is one in which a hose which remains connected to the outlet valve of the tank, as well as a hose which is disconnected from such valve, may be substantially completely enclosed and carried.

Housings of the character of those which I contemplate are of particular utility when employed for carrying hoses such as those which form part of the equipment of tank trucks used, for example, for delivering hot fuel oil. Heretofore it has been customary to lay this type of hose upon the running board alongside the tank, and to secure it in place by straps or the like. In addition to being detrimental to the appearance of the equipment, such practice has been unsatisfactory because oil from the hose runs out upon the running board and underframing, leaving them in a greasy and oily condition.

An object of this invention is to provide a hose housing for tank trucks which will permit insertion of the unloading hose whether or not the hose be equipped with an elbow and nipple, and whether the hose be connected or detatched from the tank outlet.

An object of my invention is to provide a hose housing that will not detract from the general appearance of the truck, and will serve to overcome the objections above noted.

For a clearer understanding of my invention, reference is made to the accompanying drawing in which:

Fig. 1 is a perspective view of an unmounted tank showing an unloading hose attached to the tank outlet and inserted into the hose housing;

Fig. 2 is an enlarged view of the hose housing looking from the rear end showing a method of locking the housing door; and Fig. 3 is an enlarged cross-sectional view of the housing, showing details of the door catch (plane 3—3 of Fig. 1).

Referring to the several figures of the drawing, in which like numerals denote corresponding parts, 1 is a tank adapted to be mounted on a truck, and provided with dome 2 through which the tank may be loaded and vented. Outlet 3 of tank 1 is controlled by valve 4. Unloading hose 5 attached to tank outlet 3 by a suitable coupling is shown inserted into the hose housing 6, which is disposed beneath the tank running board 7, and extends longitudinally for any desired length. The housing 6, which is preferably made of a semi-circular laterally extending bent plate 8, may be an integral part of the tank running board. To permit placing of the unloading hose 5 into housing 6, the housing is provided with a door 12, which swings on hinges 13. The door is provided with a latch handle 9, which is keyed to bar 11. By turning handle 9 counterclockwise, there is released a plurality of catches 10 which are fastened to bar 11 and which engage with a plurality of lugs 10a extending from the running board 7. This allows door 12 to swing open, whereupon the hose 5 may be placed in or removed from the housing.

For convenience, at the far end of the housing, there is provided a ring 14 loosely mounted in a support 14a, rigidly fixed to the end wall of the housing, to which the end of the hose may be secured by means of a rope or chain. Also, there is provided, when expedient, a suitable locking means, such as co-operating lugs or hasps 15, one attached to the door 12 and the other to the handle 9, through apertures of which pass the hook of a padlock 16.

Although a preferred embodiment of my invention is described in the foregoing, it is to be understood that the details herein set forth may be varied without departing from the spirit of my invention.

I claim:

In combination with a vehicle having a tank mounted longitudinally thereof and a running-board extending lengthwise of said tank, a continuous housing extending longitudinally beneath said running-board and being accessible from both the side and the rear thereof, a hose attached to the rear of said tank and extending into said housing through the rear thereof when not in use, a door hinged to the accessible side of said housing, a rod carried by the free edge of said door, catches attached to said rod, and lugs engageable by said catches to hold the door in closed position, whereby said hose may be inserted or withdrawn through the accessible side of said housing without damage to said hose and without uncoupling same from said tank.

CARL H. EHLERS.